(12) United States Patent
Kalbarga

(10) Patent No.: US 7,634,579 B1
(45) Date of Patent: Dec. 15, 2009

(54) METHOD AND SYSTEM FOR INTERPRETING AND DISPLAYING TIME DATA RECEIVED FROM A SERVER MANAGEMENT DEVICE

(75) Inventor: Subash Kalbarga, Duluth, GA (US)

(73) Assignee: American Megatrends, Inc., Norcross, GA (US)

(*) Notice: Subject to any disclaimer, the term of this patent is extended or adjusted under 35 U.S.C. 154(b) by 792 days.

(21) Appl. No.: 10/790,442

(22) Filed: Mar. 1, 2004

(51) Int. Cl.
G06F 15/173 (2006.01)
G06F 15/16 (2006.01)
H04L 9/32 (2006.01)

(52) U.S. Cl. .................. 709/248; 709/224; 713/178
(58) Field of Classification Search .......... 709/248, 709/223, 224
See application file for complete search history.

(56) References Cited

U.S. PATENT DOCUMENTS

| | | | |
|---|---|---|---|
| 6,157,618 A * | 12/2000 | Boss et al. | 370/252 |
| 6,370,161 B1 * | 4/2002 | Ehrlich et al. | 370/516 |
| 2002/0042765 A1 * | 4/2002 | Dawson | 705/35 |
| 2004/0039813 A1 * | 2/2004 | Clark et al. | 709/224 |
| 2004/0249837 A1 * | 12/2004 | Yagi et al. | 707/100 |

OTHER PUBLICATIONS

Postel et al. "Time Protocol"; RFC 868, May 1983.*
Mills et al.; "Network Time Protocol (Version 3) Specification, Implementation and Analysis."; RFC 1305, Mar. 1992.*

* cited by examiner

Primary Examiner—Patrice Winder
Assistant Examiner—Lin Liu
(74) Attorney, Agent, or Firm—Hope Baldauff Hartman, LLC (57) ABSTRACT

A method, system, and apparatus are provided for interpreting time data received from a server computer management device. According to the method, the local time at a remote computer may be received and converted to GMT. Once the local time has been converted to GMT, a command may be issued to the remote management device instructing the device to set its real time clock to GMT. The remote management device then maintains its time with reference to GMT. When data is received from the server management device, a determination is made as to whether the received data includes time data. If time data is identified, the time data is converted from GMT to a local time where the remote computer is located. The time data is then replaced with the converted time data in the received data. The received data, including the converted time, may then be displayed at the remote computer.

12 Claims, 5 Drawing Sheets

METHOD AND SYSTEM FOR INTERPRETING AND DISPLAYING TIME DATA RECEIVED FROM A SERVER MANAGEMENT DEVICE

TECHNICAL FIELD

The invention generally relates to the field of computer system management and, in particular, relates to the field of setting a real time clock on a server computer management device and retrieving and interpreting time data from the device.

BACKGROUND OF THE INVENTION

Managing the operation of remote server computers can be a difficult and time consuming task. This is especially true when several server computers must be maintained that are located in different geographical areas or when a server computer must be maintained remotely from computers located in several different geographical locations.

Devices exist that make the task of remote server management easier. These devices, called "management devices," can perform a number of tasks relating to the management of a server computer. For instance, some management devices are capable of maintaining an event log that includes health management information for a server computer such as operating temperature, hardware parameters, fan speeds, and other information.

Management devices may also maintain a real time clock and create a time-stamped entry in the event log when a health management event occurs. For instance, if the operating temperature of a server computer exceeds a threshold temperature, then the management device may create an entry in the event log that includes the time at which the temperature spike was recorded. The management device may also be connected to a network, such as the Internet, to allow the contents of the event log to be accessed remotely by a system administrator. With the correct event information in hand, the system administrator may take appropriate action to correct the problem.

One particular difficulty encountered when managing a server computer using a management device occurs when the server computer is located in a different time zone than the remote computer utilized to perform the management functions. Because the server computer and the remote computer are located in different time zones, it can be difficult to determine the actual time when events recorded in the event log actually took place. For instance, a server computer may be located in the Eastern Time Zone that has a connected management device including a real time clock set for the Eastern Time Zone. A remote computer located in the Pacific Time Zone may include a real time clock set for Pacific Time. When a system administrator utilizing the remote computer accesses an event log on the management device, the system administrator must manually convert the time entries in the event log between Eastern and Pacific time. If the system administrator forgets to convert between the time zones or converts incorrectly, the system administrator will have an incorrect understanding of when the recorded events actually took place.

One solution to this problem is to set the real time clock in the management device to the same time as the real time clock in the remote computer, regardless of the time zone in which the management device is located. By setting the real time clock of the management device the same as the time where the remote computer is located, no conversion of time data is required when a system administrator views the event log from the remote computer. However, if a second remote computer located in a different time zone from the first remote computer is utilized to access the event log on the management device, confusion may arise because the entries in the event log will be expressed in the time zone of the first remote computer. This can be very confusing for a system administrator.

It is with respect to these considerations and others that the various embodiments of the present invention have been made.

SUMMARY OF THE INVENTION

In accordance with the present invention, the above and other problems are solved by a method and apparatus for setting the time on a server management device and interpreting time data received from the server management device. Utilizing the various embodiments of the invention provided herein, time data can be retrieved from a server management device located in any time zone from a remote computer located in any time zone. When displayed at the remote computer, the time data is displayed in the local time zone where the remote computer is located, regardless of the time zone in which the management device or the remote computer is located. Accordingly, no conversion of time data received from the server computer management device need be performed.

According to one aspect of the invention, a method is provided for interpreting time data received from a server computer management device. According to the method, the local time at a remote computer may be received and converted to Greenwich Mean Time ("GMT"). As known to those skilled in the art, GMT comprises the local time at the zero meridian passing through Greenwich, England. Once the local time has been converted to GMT, a command may be issued to the remote management device instructing the device to set its real time clock to GMT. The remote management device then maintains its time with reference to GMT.

When data is received from the server management device, a determination is made as to whether the received data includes time data. For instance, server health information may be transmitted from the server management device to the remote computer. Identifying time data within the received data may comprise, for instance, searching the received data to determine if it contains data in a particular time format such as, for instance, 12:00 or 24:00.

If time data is identified, the time data is converted from GMT to a local time where the remote computer is located. The time data is then replaced with the converted time data in the received data. The received data, including the converted time, may then be displayed at the remote computer. In this manner, any time data that is received from the server management device is converted to the local time where the remote computer is located, regardless of the time zones in which the remote computer and the server management device are located. Because time is maintained at the server management device in GMT and converted at the remote computer, the server management device does not need to perform daylight savings calculations.

According to another aspect of the invention, a system for setting and receiving time data on a computer management device is provided. The system comprises a server computer having associated therewith a computer management device. The computer management device has a real time clock and is operative to generate health information regarding the operation of the server computer.

The system also comprises a remote computer that is operative to execute a world-wide-web browser application ("web browser") and a plug-in module for use with the web browser. The plug-in module is operative to receive a request, from a user for instance, to set the real time clock on the computer management device. In response to receiving such a request, the plug-in module is operative to receive a current time at the remote computer expressed with reference to the time zone in which the remote computer is located. The plug-in module is then operative to convert the current time at the remote computer to GMT. Once the current time has been converted to GMT, the plug-in module is operative to issue a request to the computer management device to set its real time clock to GMT.

The plug-in module is also operative to connect to the computer management device and to receive the health information. When the health information is received, the plug-in module is operative to analyze the health information to determine if any time data is contained in the health information, such as when an event log is transmitted that identifies the time at which particular events have occurred. If the plug-in module determines that time data is contained within the received health information, the plug-in module is operative to convert the time data from GMT to a local time where the remote computer is located. The plug-in module is further operative to replace the time data in the received health information with the converted time. The health information, including the converted time data, may then be displayed to a user of the remote computer by the web browser.

According to an embodiment, one system provided by the present invention may include a second remote computer operative to execute a second web browser and a second plug-in module. The second web browser is operative to connect to the computer management device and to receive health information from the computer management device. The second plug-in module is operative to analyze the health information to determine whether time data is contained therein, to convert the time data from Greenwich Mean Time to a local time at the second remote computer in response to determining that time data is contained therein, and to replace the time data with the converted local time. The second web browser may then display the health information including the converted time data at the second remote computer.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

As described briefly above, embodiments of the present invention provide methods and systems for remotely setting a real time clock on a computer management device and for receiving and interpreting time data received from the computer management device. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
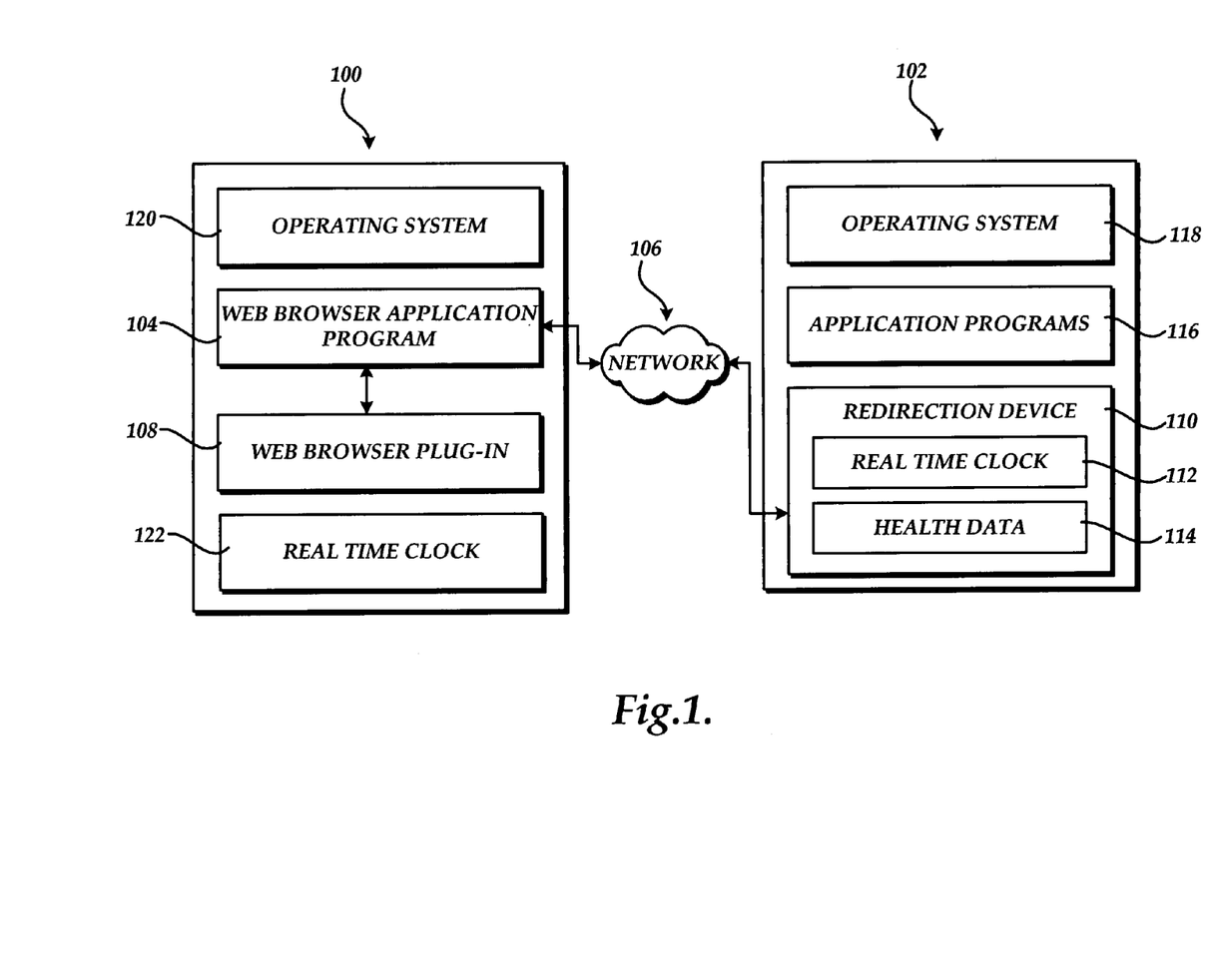
FIG. 1 is a computer system diagram illustrating a exemplary operating environment utilized by the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a system for remotely setting and accessing time data on a computer management device in one embodiment of the invention will be described. As shown in FIG. 1, the system includes a remote computer 100. The remote computer 100 comprises a standard personal computer operative to execute an operating system 120 and a Web browser application program 104, such as the INTERNET EXPLORER web browser application program from MICROSOFT CORPORATION of Redmond, Wash. Alternatively, the remote computer 100 may comprise another type of computing device operative to access a network 106, such as a personal digital assistant or other type of computer. The remote computer 100 is also connected to a network 106, such as a LAN or the Internet. It should be appreciated, however, that the remote computer 100 may be configured for communication over other types of distributed computing networks.

The remote computer 100 also includes a web browser plug-in module 108 (also referred to as a "plug-in") for use in conjunction with the Web browser 104. As known to those skilled in the art, plug-ins may be created utilizing ACTIVEX technology from MICROSOFT CORPORATION, JAVA from SUN MICROSYSTEMS, or other similar technologies from other vendors, that allow special functions to be performed within a Web browser. In particular, the plug-in 108 executes in conjunction with the Web browser 104 and communicates with a redirection device 110 operating in conjunction with a server computer 102. As will be described in greater detail below, in one embodiment, the plug-in 108 is operative to set the time of a real time clock 112 on the redirection device 110. The plug-in 108 is also operative to receive data from the redirection device 110, such as server health data 114. If time data is identified by the plug-in 108 in the received data, the plug-in 108 is operative to convert the time data from GMT time to a local time at the remote computer 100 and to display the converted data. Additional details regarding the functionality of the plug-in 108 in this regard will be described below.

The remote computer 100 also includes a real time clock 122 for maintaining a current time. As known to those skilled in the art, the real time clock may be set through a facility provided by a basic input/output system ("BIOS") of the remote computer 100 or through a facility provided by the operating system 120. The operating system 120 may also provide facilities for monitoring daylight savings time adjustments and adjusting the real time clock 122 of the remote computer 100 accordingly. It should be appreciated that the real time clock 122 may be set to the current time of the time zone in which the remote computer 100 is located, or to another time zone as desired by a user. In the embodiments of the invention described herein, however, it is assumed that the real time clock 122 maintains the current time at the location of the remote computer 100.

The server computer 102 comprises a standard server computer system. The server computer 102 is connected to the network 106 and is operative to execute an operating system 118 and one or more server programs 116, such as a web server program, a file server program, a file transfer protocol program, or other programs typically executed by a standard desktop or server computer. The server computer 102 also supports the use of an operating system independent video and input/output redirection device (referred to herein as a "redirection device" a "computer management device" or a "server management device"). In one embodiment, the redirection device receives the video output of the server computer 102 and compresses the video output for transmission to a plug-in executing on the remote computer 100. The redirection device then transmits the compressed video output of the server computer 102 to a plug-in executing on the remote computer 100 via the network connection. The plug-in is operative to decompress the data stream and to display the video output of the server computer 102 on the remote computer 100. The displayed output may include screen displays generated by the computer program 116 or the operating system 118.

It should be appreciated that the redirection device may comprise a device located internal to the server computer 102 or an external device connected to the external connections of the server computer 102. One example of an external redirection device comprises an external device that may be connected to the external video output of the server computer 102, to the network 106, and to the user input devices located at the server computer 102. Such a device is described in U.S. patent application Ser. No. 10/247,876, entitled "Systems and Methods for Establishing Interaction Between A Local Computer and a Remote Computer", which is assigned to the assignee of the instant patent application and expressly incorporated herein.

Another embodiment may comprise a redirection device that is integrated with the main system board of the server computer 102 or contained on an adapter card located within the server computer 102. Such a device is described in U.S. patent application Ser. No. 10/016,484, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

According to other aspects of the invention, the redirection device 110 is also operative to maintain a real time clock 112. As discussed above, the real time clock 112 is utilized to maintain a time for the redirection device 110. The time may be utilized for instance when monitoring the operation of the server computer 102 to compile the health data 114. If a system management event occurs, the redirection device may create an entry in the health data 114 indicating that the event has occurred and providing the time and data at which the event occurred. The time and data may be retrieved from the real time clock. It should be appreciated that the video redirection capabilities of the redirection device 110 described above are optional and are not required to utilized the embodiments of the invention described herein.

The redirection device 110 is also operative to provide an interface for retrieving the health data 114, or other data regarding the operation of the redirection device 110 or the server computer 102, to the remote computer 100. In particular, the web browser 104, or another application configured for custom communication with the redirection device 110, may be utilized to retrieve the health data 114 or other data from the redirection device 110. To enable this functionality, the redirection device 110 may include an embedded web server program for receiving and responding to requests for the health data 114 and other data maintained by the redirection device 110.

The plug-in module 108 is operative to execute in conjunction with the web browser 104 to determine whether data received from the redirection device includes time data. For instance, if an event log includes entries that specify a time at which an event occurred. If time data is located, the plug-in 108 is operative to convert the time data to the time at the remote computer 100. The received data, including the converted time, may then be displayed by the web browser 104. Additional details regarding this process are described below.

Figure 2:
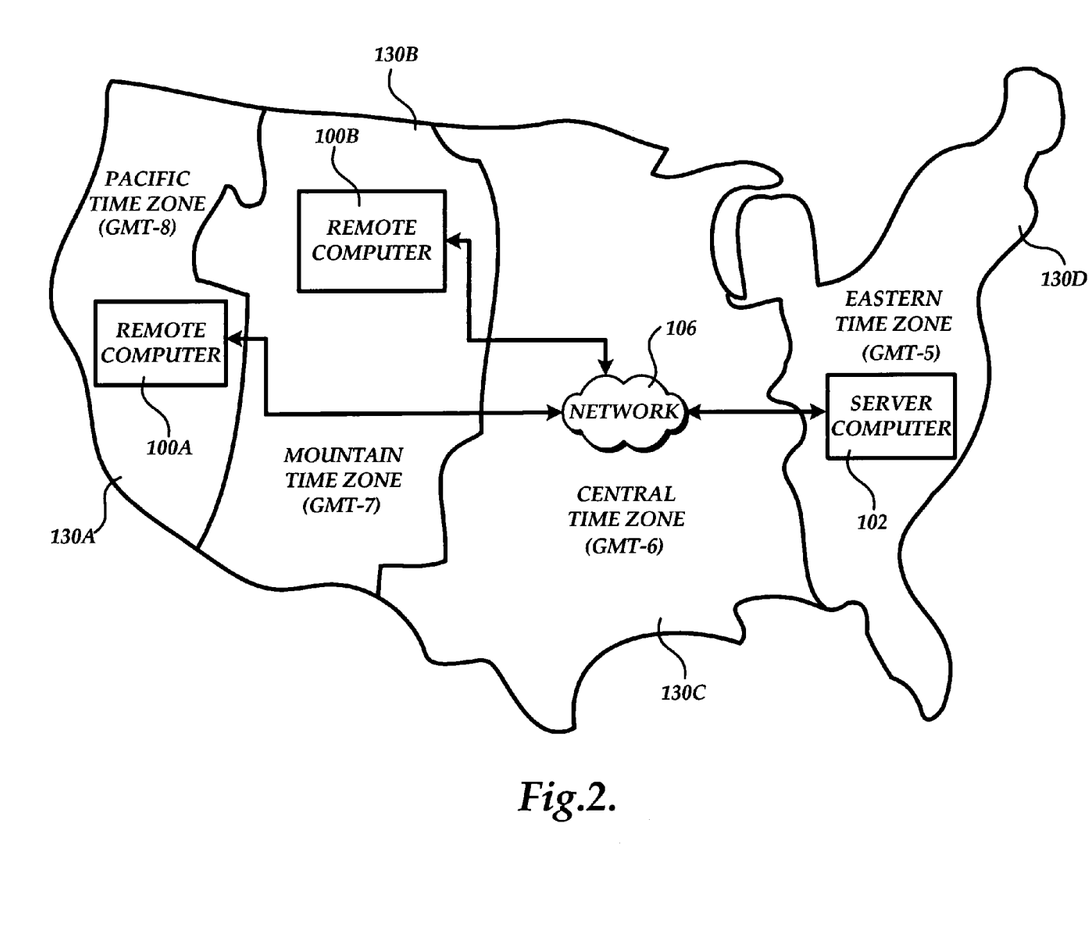
FIG. 2 is a computer system diagram illustrating the various geographical locations of remote computer systems and server computer systems utilized in the various embodiments of the invention.

Referring now to FIG. 2, a computer system diagram illustrating the various geographical locations of remote computer systems and server computer systems utilized in the various embodiments of the invention will be described. As shown in FIG. 2, a server computer 102 and two remote computers 100A may be located in different time zones. For instance, the server computer 102 may be located in the eastern time zone 130D, the remote computer 100A may be located in the pacific time zone 130A, and the remote computer 100B may be located in the central time zone.

Each of the remote computers 100A-100B is configured identically in the manner described above with respect to FIG. 1. Accordingly, the plug-in 108 executing on either of the remote computers 100A-100B may be utilized to set the real time clock 112 on the redirection device 110. In particular, the plug-in 108 may receive from a user the local time in the time zone in which the remote computer 100A or 100B is located. The plug-in is then operative to convert the received time to GMT. Once the time has been converted to GMT, the plug-in 108 is operative to transmit a command to the redirection device to set the real time clock 112 to GMT. The real time clock 112 is then maintained by the redirection device 110 relative to GMT.

When the web browser 104 executing on either of the remote computers 100A-100B is utilized to retrieve data from the redirection device 110, the plug-in 108 examines incoming data from the redirection device 110 to determine if the incoming data includes any time data. If the incoming data includes time data, the plug-in 108 is then operative to convert the time data from GMT to a current time at the location where the remote computer is located. For instance, if the remote computer 100A receives data from the redirection device 110 that includes time data, the plug-in 108 will convert the time data from GMT to Pacific time (GMT-8). If, however, the remote computer 100B receives the same time data, the plug-in 108 executing on the remote computer 100B will convert the time data from GMT to Central time (GMT-7). Therefore, when the time data is displayed on either the remote computer 100A or the remote computer 100B, the time will be reflected in the correct time for the location of the remote computer. This is true regardless of the time zone in which the remote computer is located in.

Figure 3:
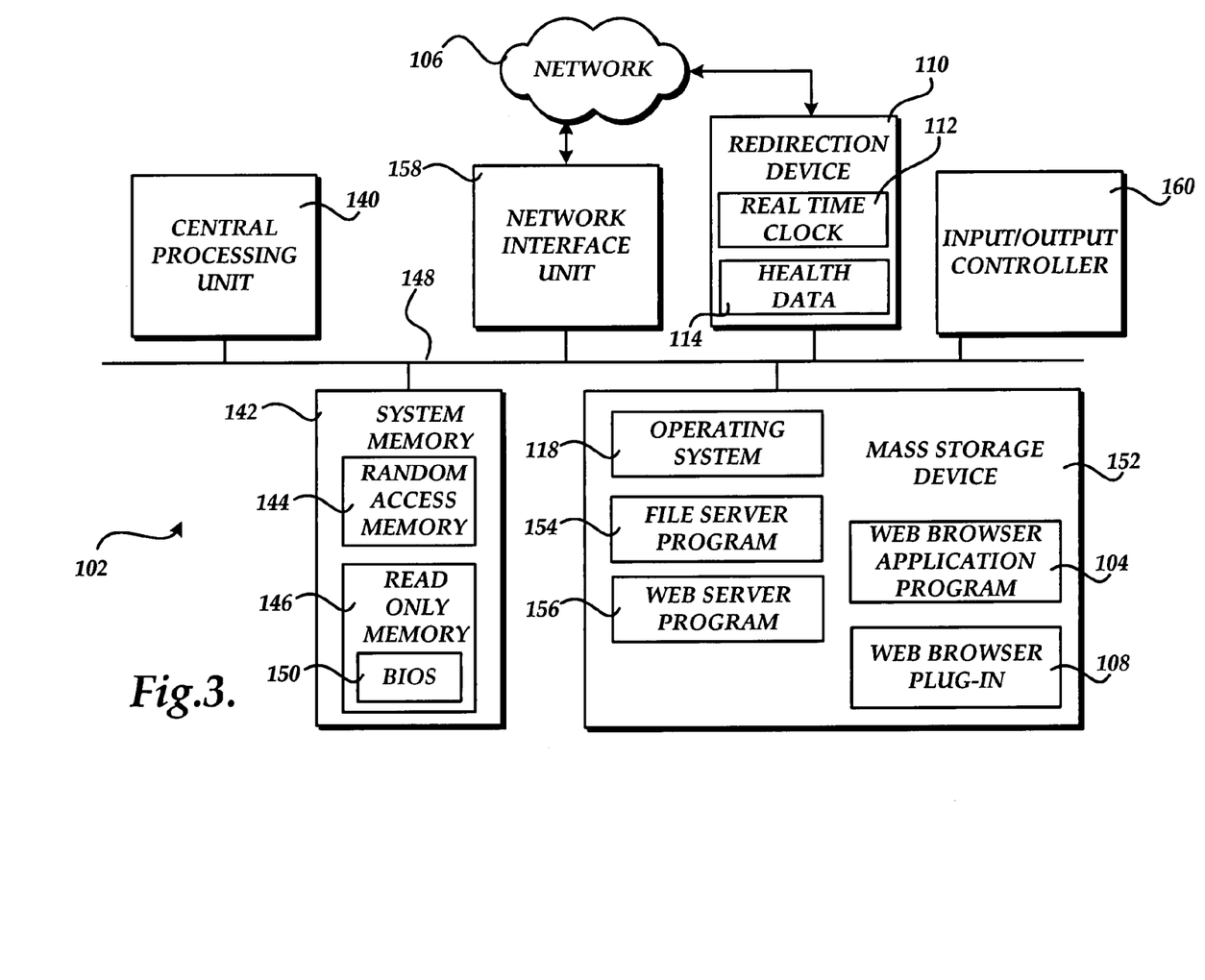
FIG. 3 is a computer architecture diagram illustrating a computer architecture utilized by a server computer and a remote computer according to the various embodiments of the invention.

Referring now to FIG. 3, an illustrative computer architecture for a server computer 102 for practicing the various embodiments of the invention will be described. The computer architecture shown in FIG. 3 illustrates a conventional server computer, including a central processing unit 140 ("CPU"), a system memory 142, including a random access memory 144 ("RAM") and a read-only memory ("ROM") 146, and a system bus 148 that couples the memory to the CPU 140.

A BIOS 150 containing the basic routines that help to transfer information between elements within the server computer 102, such as during startup, is stored in the ROM 146. The server computer 102 further includes a mass storage device 152 for storing an operating system 118 suitable for controlling the operation of a networked server computer, such as the WINDOWS NT or XP operating systems from MICROSOFT CORPORATION of Redmond, Wash. The mass storage device 152 also stores server programs, such as a file server program 154 and a web server program 156.

The mass storage device 152 is connected to the CPU 140 through a mass storage controller (not shown) connected to the bus 148. The mass storage device 152 and its associated computer-readable media, provide non-volatile storage for the server computer 102. Although the description of computer-readable media contained herein refers to a mass storage device, such as a hard disk or CD-ROM drive, it should be appreciated by those skilled in the art that computer-readable media can be any available media that can be accessed by the server computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the server computer 102 may operate in a networked environment using logical connections to remote computers through a network 106, such as the Internet or a LAN. The computer 102 may connect to the network 106 through a network interface unit 158 connected to the bus 148. It should be appreciated that the network interface unit 158 may also be utilized to connect to other types of networks and remote computer systems. The computer 102 may also include an input/output controller 160 for receiving and processing input from a number of devices, including a keyboard, mouse, or electronic stylus (not shown in FIG. 3). Similarly, an input/output controller 160 may provide output to a display screen, a printer, or other type of output device.

The computer 102 also includes a redirection device 110. As described above, the redirection device 110 may be internal or external to the computer 102. The redirection device may receive and compresses the video output of the computer 102 for transmission over the network 106. The redirection device 110 also transmits the compressed screen displays to a plug-in executing on a remotely located computer, where the data may be decompressed and displayed. Because the redirection device 110 is implemented in hardware, operation of the redirection device 110 is not dependent on the execution of a particular type of operating system 118. Moreover, because the redirection device 110 is implemented in hardware, the operating system 118 does not have to be loaded by the computer 102 for the screen displays of the computer 102 to be compressed and transmitted. In this manner, the computer 102 may be remotely controlled immediately after it is powered on and without the need to load any operating system. It should be appreciated that the input/output redirection features of the redirection device 110 are optional.

As discussed briefly above, the redirection device 110 also provides functionality for monitoring the health of the server computer 102. Health monitoring may include monitoring one or more operational characteristics of the server computer 102 and maintaining a database containing such information. Health monitoring may also include comparing monitored characteristics to stored parameters to determine whether the server computer 102 is operating within tolerance. If the computer 102 is not operating within tolerances, the redirection device 110 may make a record to the malfunction and store the record as health data 114. The health data 114, may include time data specifying, for instance, the time at which a health event took place. Other types of data may be maintained by the redirection device 110 that includes time data. The redirection device 110 may also provide functionality for providing access to the health data 114 via the network 106. In particular, the redirection device 110 may receive and respond to requests for the health data 114 using a web server program or similar server application.

It should also be appreciated that the remote computer 100 may include many of the convention components of the server computer 102 shown in FIG. 3. A mass storage device 152 connected to the remote computer 100 may also store a web browser application program 104 and a web browser plug-in 108. The other conventional components shown in FIG. 3 may also be utilized at the remote computer 100.

Figure 4:
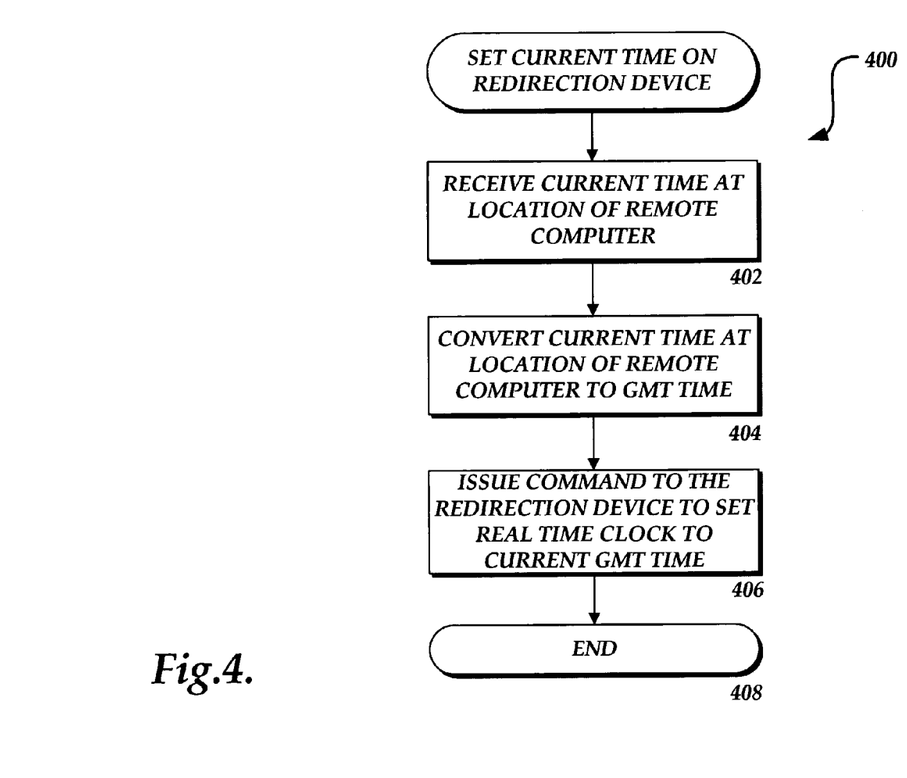
FIGS. 4 and 5 are flow diagrams showing illustrative routines for setting the time and retrieving the time, respectively, from a management device provided by the various embodiments of the invention.

Referring now to FIG. 4, an illustrative routine 400 will be described illustrating a process performed by the plug-in module 108 for setting the real time clock 112 on the redirection device 110. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4 and 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 400 is executed in response to a request from a user to set the time on the redirection device 110. The routine 400 begins at operation 402, where the current time at the location of the remote computer 100 is received by the plug-in 108, typically from a user. The user may also identify the time zone the remote computer 100 is located in to the plug-in 108. Alternatively, the plug-in 108 may query the operating system 120 for the time zone information.

From operation 402, the routine 400 then continues to operation 404, where the plug-in 108 converts the received time to GMT. This conversion is done based on the current time and the time zone in which the remote computer 100 is located relative to GMT. For instance, if the remote computer 100 is located in the Pacific Time zone (GMT-8), eight hours would be added from the current time to arrive at GMT. Once GMT has been determined, the routine 400 continues to operation 406.

At operation 406, the plug-in 108 issues a command to the redirection device 110 to set its real time clock 112 to GMT. In response to receiving the command, the redirection device 110 sets the real time clock to GMT. The real time clock 112 then maintains the current time with respect to GMT. From operation 406, the routine 400 continues to operation 408, where it ends.

Figure 5:
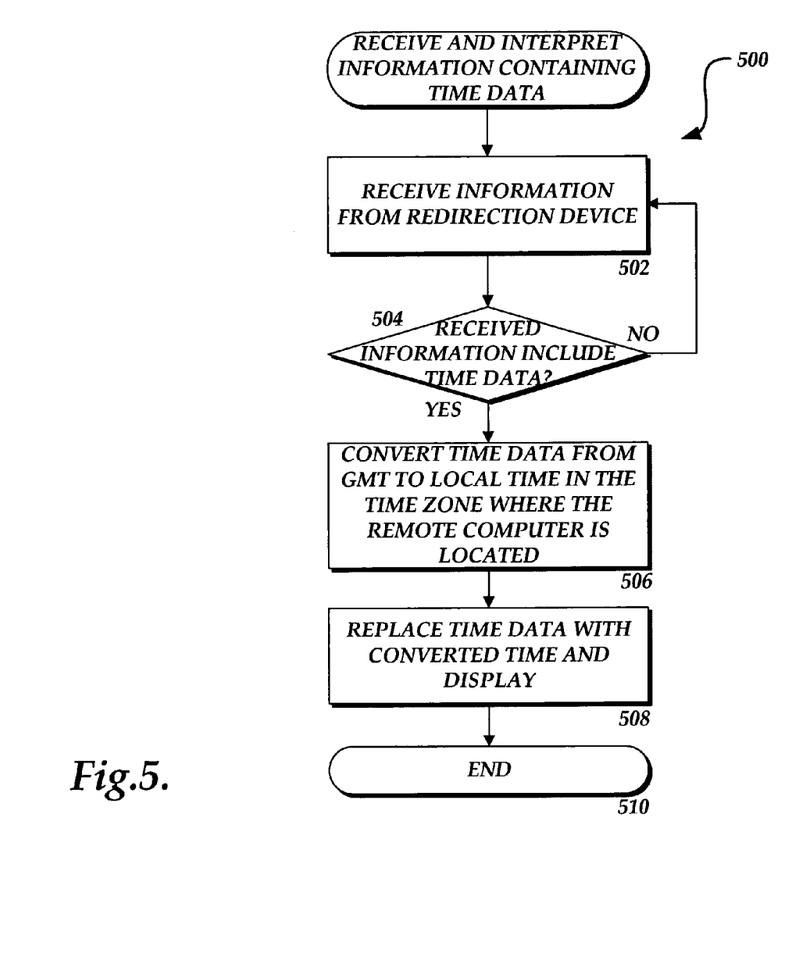

Turning now to FIG. 5, an illustrative routine 500 will be described for retrieving time data from the redirection device 110 and for interpreting the received time data for the time zone in which the remote computer 100 is located. The routine 500 begins at operation 502, where information is received from the redirection device 110. This may occur, for instance, in response to utilization of the web browser 104 to request data from the redirection device 110. Such data may include, for instance, health data 114, or other types of data maintained at the redirection device 110. From operation 502, the routine 500 continues to operation 504.

At operation 504, the plug-in 108 determines whether the data received from the redirection device 110 includes time data. This may be accomplished, for instance, by searching the received data for data formatted in a manner likely to indicate that it is time data (e.g. HH:MM or HH:MM:SS). The format utilized by the redirection device 110 to specify time may be standardized so that the plug-in 108 can easily determine when time data has been received. If no time data has been received, the routine 500 branches back to operation 502, where additional data is received. If, however, time data has been received, the routine 500 continues to operation 506.

At operation 506, the plug-in 108 converts the received time data from GMT to the local time in the time zone where the remote computer 100 is located. For instance, if the received time data is 18:00 (GMT) and the time zone of the remote computer 100 is the Pacific time zone (GMT-8), then the converted value will be 10:00 PST. All of the time data identified in the data received from the redirection device 110 is converted in this manner. By converting the time data in this way, time information received from the redirection device is displayed relative to the time zone in which the remote computer is located.

From operation 506, the routine 500 continues to operation 508, where the plug-in 108 replaces the time data contained in the data received from the redirection device 110 with the converted time data. The received data, including the converted time data, may then be displayed to a user by the web browser 104. By replacing the received time data with the converted time data in this manner, it is invisible to the user that the time was originally received from the redirection device in GMT. From operation 508, the routine 500 continues to operation 510, where it ends.

Based on the foregoing, it should be appreciated that the various embodiments of the invention include a method, system, apparatus, and computer-readable medium for interpreting and displaying time data received from a computer management device. The above specification, examples and data provide a complete description of the manufacture and use of the composition of the invention. Since many embodiments of the invention can be made without departing from the spirit and scope of the invention, the invention resides in the claims hereinafter appended.

I claim:

1. A system for setting a real-time clock on a redirection device and converting time data received from the redirection device comprising:

a redirection device operatively connected to a server computer and comprising a real-time clock operative to maintain a time for the redirection device, the redirection device operative to:

receive a command to set the real-time clock to a specified GMT time value, in response to receiving the command, set the real-time clock to the specified GMT time value, monitor operation of the server computer to compile health data, the health data comprising one or more health management events and a GMT time at which each of the health management events occurred retrieved from the real-time clock; and a web browser plug-in module executing on a remote computer communicatively connected to the redirection device, the web browser plug-in module operative to:

send a command to the redirection device to set the real-time clock to the specified GMT time value, retrieve the health data from the redirection device, upon retrieving the health data, determine whether the health data includes time data, upon determining that the health data includes time data, convert the time data from the GMT time to a local time, and replace the time data in the health data with the converted time data.

2. The system of claim 1 wherein the health management events comprise one or more of a temperature event, a hardware parameter event, a fan speed event, or other event regarding the operation of the server computer.

3. The system of claim 1, wherein the redirection device is further operative to receive video output of the server computer, compress the video output, and transmit the video output to the web browser plug-in module.

4. The system of claim 1, wherein determining that the retrieved health data includes time data comprises searching the retrieved health data for data formatted in a manner likely to indicate that it is time data.

5. The system of claim 4 wherein the time data is formatted in a manner consistent with one of a "HH:MM" format and a "HH:MM:SS" format.

6. The system of claim 1, wherein the web browser plug-in module is further operative to display the health data including the converted time data.

7. A method for interpreting time data received from a server management device, the method comprising:
- receiving a local time;
- converting the local time to a Greenwich Mean Time;
- issuing a command to the server management device to set a real time clock to the Greenwich Mean Time, wherein the server management device is implemented in hardware communicatively connected to a server computer and wherein the real time clock is operative to maintain a time for the server management device;
- receiving data associated with the server computer from the server management device at a remote computer;
- determining from a format of the received data whether the received data includes time data;
- in response to determining that the received data includes time data, converting the time data from Greenwich Mean Time to a local time;
- replacing the time data in the received data with the converted local time; and
- displaying the received data.

8. The method of claim 7, wherein displaying the received data comprises displaying the received data at the remote computer.

9. A computer-readable medium having computer-executable instructions stored thereon which, when executed by a computer, will cause the computer to perform the method of claim 7.

10. A computer-controlled apparatus capable of performing the method of claim 7.

11. An apparatus for setting a real time clock of a computer management device communicatively connected to the apparatus and for receiving and displaying time data from the computer management device, the apparatus comprising:
- a central processing unit; and
- a memory having stored thereon an operating system for execution on the central processing unit, a web browser for execution on the operating system, and a web browser plug-in module for execution in conjunction with the web browser, the web browser plug-in module operative to receive a request to set the real time clock of the computer management device, to receive a current local time, to convert the current local time to a Greenwich Mean Time value, and to issue a command to the computer management device to set the real time clock to the Greenwich Mean Time value, wherein the real time clock is operative to maintain a time for the computer management device,
- wherein the web browser is operative to connect to the computer management device and to receive health information from the computer management device, and wherein the web browser plug-in module is further operative to analyze the health information to determine whether time data is contained therein, to convert the time data from Greenwich Mean Time to a local time in response to determining that time data is contained therein, and to replace the time data with the converted local time.

12. The apparatus of claim 11, wherein the web browser is further operative to display the health information including the converted time data.

* * * * *